United States Patent
Aurousseau

(10) Patent No.: US 8,762,025 B2
(45) Date of Patent: Jun. 24, 2014

(54) METHOD AND SYSTEM FOR CONTROLLING A GAS TURBINE AND A GAS TURBINE INCLUDING SUCH A SYSTEM

(75) Inventor: Christian Aurousseau, Rubelles (FR)

(73) Assignee: SNECMA, Paris (FR)

( * ) Notice: Subject to any disclaimer, the term of this patent is extended or adjusted under 35 U.S.C. 154(b) by 146 days.

(21) Appl. No.: 13/201,788

(22) PCT Filed: Jan. 15, 2010

(86) PCT No.: PCT/FR2010/050061
§ 371 (c)(1),
(2), (4) Date: Aug. 16, 2011

(87) PCT Pub. No.: WO2010/092268
PCT Pub. Date: Aug. 19, 2010

(65) Prior Publication Data
US 2011/0301822 A1    Dec. 8, 2011

(30) Foreign Application Priority Data

Feb. 16, 2009  (FR) ..................................... 09 50986

(51) Int. Cl.
*F02C 9/54*     (2006.01)
*F01D 17/16*    (2006.01)
*F02C 9/26*     (2006.01)

(52) U.S. Cl.
USPC .......... 701/100; 60/773; 60/39.25; 415/154.3

(58) Field of Classification Search
USPC ................. 701/100; 60/39.25, 773; 415/154.3
See application file for complete search history.

(56) References Cited

U.S. PATENT DOCUMENTS

| | | | |
|---|---|---|---|
| 3,797,233 A * | 3/1974 | Webb et al. .................... | 60/791 |
| 2004/0055273 A1 | 3/2004 | Hirayama et al. | |
| 2005/0204745 A1 | 9/2005 | Hirayama et al. | |

FOREIGN PATENT DOCUMENTS

| | | |
|---|---|---|
| DE | 103 22 703 | 12/2003 |
| EP | 0 427 952 | 5/1991 |
| WO | 2009 109446 | 9/2009 |
| WO | WO 2009109446 A1 * | 9/2009 |

OTHER PUBLICATIONS english translation of WO 2009/109446 A1.*
International Search Report issued Jun. 4, 2010 in PCT/FR10/050061 filed Jan. 15, 2010.

* cited by examiner

*Primary Examiner* — Fadey Jabr
*Assistant Examiner* — Yazan A Soofi
(74) *Attorney, Agent, or Firm* — Oblon, Spivak, McClelland, Maier & Neustadt, L.L.P.

(57) ABSTRACT

A method for controlling a gas turbine including a compressor assembly including at least one variable geometry portion, a combustion chamber, and a turbine assembly. The method generates a flow rate setpoint value for fuel to be fed to the combustion chamber as a function of a desired speed of the gas turbine, computes threshold values for maintaining the fuel flow setpoint value in a given range, the threshold values depending on a thermodynamic state of the gas turbine, and controls the position of the variable geometry portion by controlling an actuator as a function of the difference between position information representative of the instantaneous position and setpoint position information. The threshold values are automatically adjusted by computation in real time as a function of the instantaneous position information of the variable geometry portion or of the difference between this position information and the setpoint position information.

11 Claims, 5 Drawing Sheets

METHOD AND SYSTEM FOR CONTROLLING A GAS TURBINE AND A GAS TURBINE INCLUDING SUCH A SYSTEM

BACKGROUND OF THE INVENTION

The invention relates to the control of a gas turbine, in particular, but not exclusively of a gas turbine for an aeronautical engine, more particularly a turbo-jet engine.

In a turbo-jet engine, several control loops are provided, more particularly:
a main control loop for slaving the speed of the turbo-jet engine on a speed setpoint depending on the desired thrust, by action on the flow rate of fuel fed to the combustion chamber of the gas turbine, and
local control loops for slaving the position of portions of variable geometry.

In a turbo-jet engine with several spools, for example with a low pressure (LP) spool (compressor and turbine) and a high pressure (HP) spool, the magnitude servo-controlled by the main control loop may be the speed of rotation NLP of the shaft connecting the LP turbine to the LP compressor. Another magnitude may be used, in particular the engine pressure ratio (or EPR), i.e. the ratio between the pressure at the inlet of the LP compressor (or fan) and the pressure at the outlet of the LP compressor (or fan).

The portions of variable geometry, designated also hereafter by "variable geometries" have positions slaved on setpoint values depending on the speed of the turbo-jet engine, which may be reduced, or during transient phases (switching from one speed to another). Well known examples of variable geometries are the assemblies of compressor stator vanes with a variable setting angle, or VSV (Variable Stator Vanes), valves for picking up air for discharging the compressor, or VBV (Variable Bleed Valves) which are controlled during the whole operating time of the turbo-jet engine in flight, or further valves for picking up air for transient discharge of the compressor or TBV (Transient Bleed Valves) which are controlled during particular flight phases.

In order to ensure sound operation of the turbo-jet engine, in particular in order to avoid stallings of the compressor, extinctions of combustion or overspeeds, thresholds are introduced into the main control loop, which limit the increase or decrease of the fuel flow rate during a requested change of speed for the turbo-jet engine. These thresholds are computed depending on the estimated thermodynamic state of the turbo-jet engine at the instant of the change in speed. Now, in some circumstances, and in particular during successive transitions between speeds, a significant difference may exist between the estimated thermodynamic state of the turbo-jet engine and its actual state, which imposes that an additional margin be taken on the computed thresholds or on the dimensioning of the compressor.

OBJECT AND SUMMARY OF THE INVENTION

The invention aims at remedying the aforementioned drawback and proposes for this purpose, according to a first aspect, a method for controlling a gas turbine having a compressor assembly with at least one portion of variable geometry, a combustion chamber and a turbine assembly, the method comprising:
generating a flow setpoint value for the fuel to be fed to the combustion chamber on the basis of a desired speed of the gas turbine,
computing threshold values for maintaining the fuel flow setpoint value greater than or equal to a minimum limit value and less than or equal to a maximum limit value, the threshold values depending on a thermodynamic state of the gas turbine, and
controlling the position of the variable geometry portion by controlling an actuator as a function of the difference between detected position information representative of the instantaneous position of the variable geometry portion and setpoint position information,
method wherein, according to the invention,
the threshold values are automatically adjusted by real-time computation as a function of the detected position information representative of the instantaneous position of the variable geometry portion or of the difference between this detected position information and the setpoint position information.

Thus, the invention is remarkable in that by taking into account a piece of information representing the actual position of the variable geometry, it is possible to approach at best the instantaneous actual thermodynamic state of the turbo-jet engine in order to compute thresholds in an optimum way.

Consequently:
at equivalent performances of the compressor assembly and of the control, the acceleration time may be improved and the stalling risks may be reduced during a transition to a higher speed, or
at equivalent performances of the control, the compressor assembly may be optimized by reducing the stalling margin, whence a reduction in mass, or
at equivalent performances of the compressor assembly, a larger tolerance may be admitted on the specifications of the control.

According to an embodiment of the method, the threshold values are computed as a function of a thermodynamic state of the gas turbine to which corresponds the setpoint position of the variable geometry portion and are corrected in real time as a function of the difference between the detected position and the setpoint position of the variable geometry portion.

According to another embodiment of the method, the threshold values are computed as a function of a thermodynamic state of the gas turbine by directly taking into account the detected position of the variable geometry portion.

The variable geometry portion may be at least one from an assembly of stator vanes with variable setting angle and valves for picking up air in the compressor assembly.

The computed threshold values may be C/P Fuel Air Ratio values where C is the fuel flow rate to be fed to the combustion chamber and P is the pressure at the outlet of the compressor assembly.

According to a second aspect of the invention, the latter relates to a system for controlling a gas turbine having a compressor assembly with at least one portion of variable geometry, a combustion chamber and a turbine assembly, the control system comprising:
a circuit for generating a flow setpoint value for fuel to be fed to the combustion chamber as a function of a desired speed of the gas turbine, the circuit for generating the fuel flow setpoint value comprising a circuit for computing threshold values in order to maintain the fuel flow setpoint value greater than or equal to a minimum limit value and less than or equal to a maximum limit value, and
a circuit for controlling the position of the variable geometry portion comprising a position sensor in order to provide information representative of a detected position of the variable geometry portion, an actuator acting on the variable geometry portion in order to control its position and a circuit for controlling the actuator for slaving the position of the variable geometry portion on a setpoint position, a control system in which, according to the invention, the circuit for computing threshold values is connected to the circuit for controlling the position of the variable geometry portion in order to automatically adjust the threshold values by real time computing as a function of the detected position of the variable geometry portion or of the difference between the detected position and the setpoint position.

According to an embodiment, the circuit for computing threshold values is designed so as to compute threshold values as a function of a thermodynamic state of the gas turbine to which corresponds a setpoint position of the variable geometry portion and for correcting the computed threshold values according to the difference between the detected position and the setpoint position of the variable geometry portion.

According to another embodiment, the circuit for computing threshold values is designed for computing threshold values as a function of a thermodynamic state of the gas turbine by directly taking into account the detected position of the variable geometry portion.

According to a particularity of the control system, the circuit for computing threshold values is connected to at least one circuit for controlling the position of a variable geometry portion selected from an assembly of stator vanes with a variable setting angle and valves for picking up air in the compressor assembly.

According to another particularity of the tuning system, the circuit for computing threshold values is designed so as to compute C/P Fuel Air Ratio threshold values where C is the rate of fuel flow to be fed to the combustion chamber and P is the pressure at the outlet of the compressor assembly.

According to still another of its aspects, the invention relates to a gas turbine, in particular an aircraft turbo-jet engine, provided with a control system as defined above.

SHORT DESCRIPTION OF THE DRAWINGS

The invention will be better understood upon reading the description made hereafter, as an indication but not as a limitation, with reference to the appended drawings, wherein:

FIG. 1 very schematically shows an aircraft turbine engine;

DETAILED DESCRIPTION OF EMBODIMENTS OF THE INVENTION

The following description is made within the scope of the application to aircraft turbo-jet engines. The invention is however applicable to other types of aeronautical gas turbines, such as helicopter turbines, or to industrial turbines.

Figure 1:
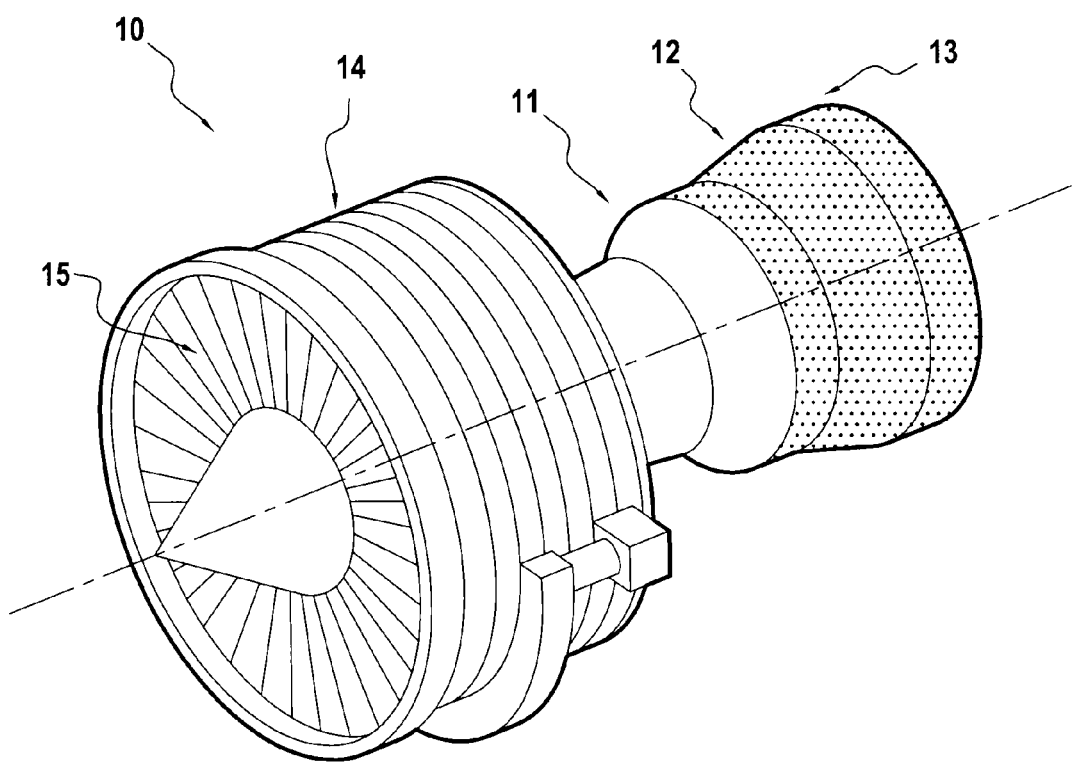

FIG. 1 shows in a very schematic way a twin spool turbo-jet engine 10 for an airplane. The turbo-jet engine 10 comprises a combustion chamber 11 provided with injectors, the combustion gases from the chamber 11 driving a HP turbine 12 and a LP turbine 13. The HP turbine 12 is coupled by an HP shaft to an HP compressor 14 supplying pressurized air to the combustion chamber 11, whereas the LP turbine 13 is coupled through a LP shaft to a fan 15 at the inlet of the turbo-jet engine.

Figure 2:
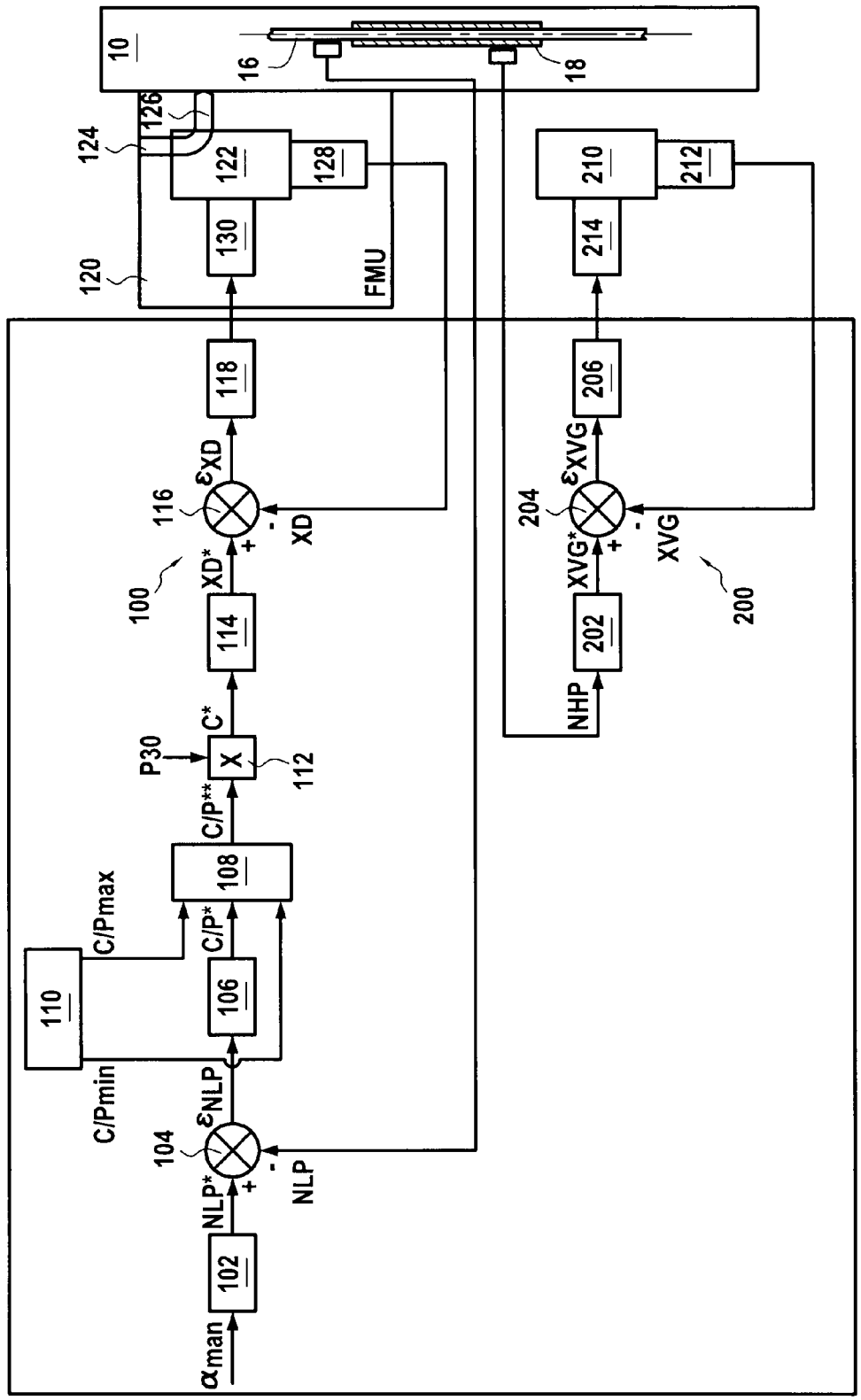
FIG. 2 shows a diagram of a system for controlling a turbo-jet engine according to the prior art.

An embodiment of a control system according to the prior art is schematically shown by FIG. 2.

The control system comprises a main control loop 100 for slaving the speed of the turbo-jet engine on a value corresponding to a desired thrust. In the illustrated example, the slaved magnitude is the speed of rotation NLP of the LP shaft 16.

The main control loop comprises a function generator 102 which receives a thrust setpoint information usually expressed by a thrust lever angle $\alpha_{man}$ and which transforms this piece of information into a setpoint value NLP* of the LP shaft speed.

A sensor (not shown) provides representative information on the instantaneous actual value NLP of the LP shaft. A comparator 104 provides a difference signal $\epsilon$NLP, the sign and amplitude of which reflect the actual value of the difference between NLP* and NLP.

The difference $\epsilon$NLP is transformed by a corrector circuit 106 of the PID (Proportional-Integral-Derivative) type into a value representative of the Fuel Air Ratio setpoint (C/P)*, where C is the rate of fuel flow to be fed to the combustion chamber and P is the pressure at the outlet of the compressor assembly. The pressure P being substantially the one prevailing in the combustion chamber, which is representative of the air flow fed into the chamber, the C/P value is representative of the Fuel Air Ratio of the fuel/air mixture (ratio between the fuel flow and the air flow fed to the combustion chamber).

A thresholding circuit 108 receives the C/P setpoint value (C/P)*, as well as values of abutment or maximum threshold $C/P_{max}$ for the magnitude C/P and of abutment or minimum threshold $C/P_{min}$ for this same magnitude. The thresholds $C/P_{max}$ and $C/P_{min}$ are provided by a computation circuit 110 for example integrated into the engine control unit ECU of the turbo-jet engine.

The circuit 108 provides a thresholded setpoint value (C/P)** such that:

$(C/P)^{**}=(C/P)^{*}$ if $(C/P)^{*} \leq C/P_{max}$ and $(C/P)^{*} \geq C/P_{min}$ $(C/P)^{**}=C/P_{max}$ if $(C/P)^{*} \geq C/P_{max}$ and $(C/P)^{**}=C/P_{min}$ if $(C/P)^{*} \leq C/P_{min}$.

A circuit 112 receives the thresholded setpoint value (C/P)** and information representative of the pressure P30 at the outlet of the HP compressor and provides a fuel flow setpoint value C* in order to control a metering device 122 of a fuel metering unit 120 for delivering to the combustion chamber a fuel flow corresponding to the setpoint C*.

The metering device 122 is usually a metering device with constant pressure difference between its inlet connected to a conduit 124 for supplying pressurized fuel and its outlet connected through a conduit 126 to the injectors of the combustion chamber of the turbo-jet engine, and the delivered flow is proportional to the position of a mobile member of the metering device. A function generator 114 transforms the set value C* into a position setpoint value XD*.

A comparator 116 receives the position setpoint value XD* and an actual position value XD provided by a position sensor 128 associated with the metering device and computes the difference ϵXD between XD* and XD. A corrector circuit 118 of the PID type receives the difference ϵXD and generates a magnitude representative of the intensity of the current controlling a servovalve 130 associated with the metering device 122 in order to bring the latter into the intended position, which should therefore bring the flow of injected fuel to the desired value C*.

Figure 3:
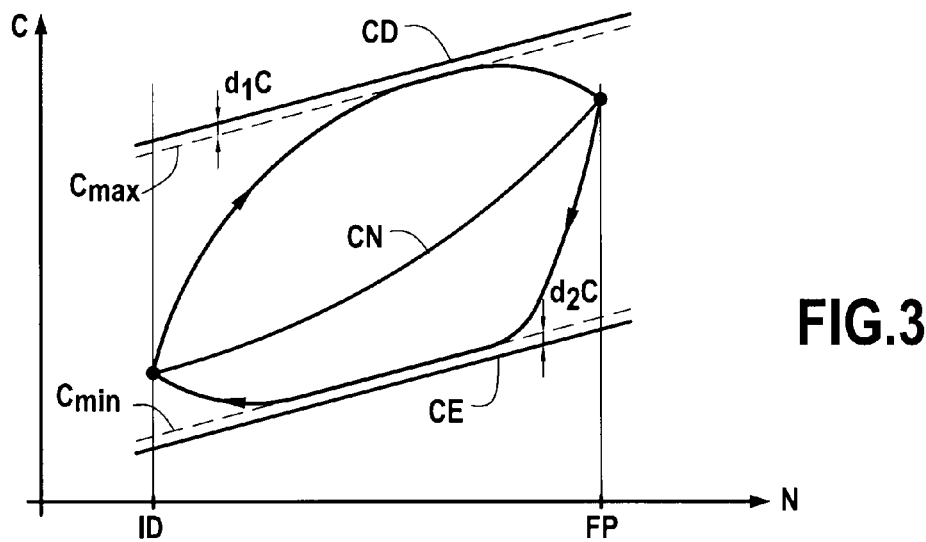
FIGS. 3 and 4 are curves showing the variation of in the fuel flow rate and of a quantity representative of the Fuel Air Ratio of the fuel/air mixture (C/P) versus the speed (or the reduced speed)

FIG. 3 shows the variation of the fuel flow C as a function of the speed N of the turbo-jet engine.

In FIG. 3, the curves CD and CE represent the stalling line of the compressor and the lean extinction line. The curve $C_{max}$ represents the flow value maximum threshold and is substantially parallel to the curve CD, while being located below the latter in order to provide a safety margin $d_1 C$. The curve $C_{min}$ represents the flow value minimum threshold and is substantially parallel to the curve CE while being located above the latter in order to provide a safety margin $d_2 C$.

Upon switching from an idle speed ID to a full power speed FP, the fuel flow rate initially increases strongly until it encounters the curve $C_{max}$ and follows the latter before reaching the value corresponding to the FP speed. Conversely, upon switching from the FP speed to the ID speed, the fuel flow rate initially decreases strongly until it encounters the curve $C_{min}$ and follows the latter before reaching the value corresponding to the ID speed.

The curve CN illustrates the flow rate value under stabilized conditions.

Figure 4:
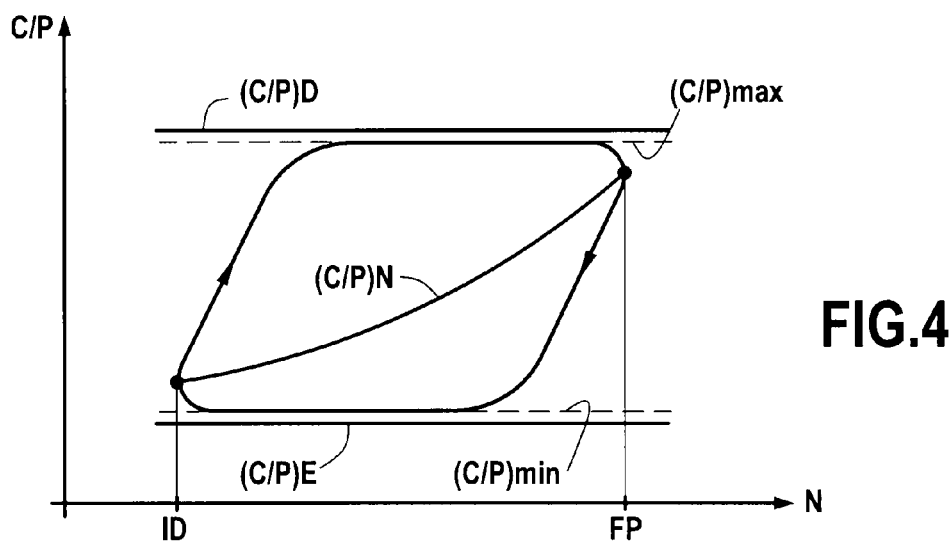

FIG. 4 similarly shows the change in the magnitude C/P as a function of the speed N of the turbo-jet engine.

The curve (C/P)N represents the value under stabilized conditions. It is noted that it is constant here, representing an invariant of the turbo-jet engine.

The curves (C/P)D and (C/P)E represent the stalling line of the compressor and of the lean extinction line and the lines $(C/P)_{max}$ and $(C/P)_{min}$ represent the values of maximum and minimum abutments or threshold values of C/P.

The variation of C/P under transient conditions from the ID speed to the FP speed and vice versa is also illustrated.

For a given turbo-jet engine, the threshold values $(C/P)_{max}$ and $(C/P)_{min}$ depend upon a certain number of parameters.

Thus $(C/P)_{max}$ depends upon the rotation speed NHP of the shaft connecting the HP turbine to the HP compressor, the temperature T25 at the inlet of the HP compressor, the pressure $P_i$ at the inlet of the compressor, the incidence i (angle between the axis of the airplane and the displacement direction), the airplane's slip angle, predetermined maximum admissible values in particular for NHP, NLP, P30, and the temperature T50 at the outlet of the LP turbine, while taking into account the position which should be that of variable geometries for the relevant speed of the turbo-jet engine.

Similarly, $(C/P)_{min}$ depends on the speed NHP, on the temperature T25, on the pressure P30 and minimum admissible values in particular for NHP, NLP, P30, taking into account the position which should be that of the variable geometries for the relevant speed.

In order to lighten the real time computing operations in flight, the values of $(C/P)_{max}$ and $(C/P)_{min}$ are computed by the circuit 110 as:

$$(C/P)_{max} = F_1(N, T, P_i, i, \ldots)$$

$$(C/P)_{min} = F_2(N, T, P_i, i, \ldots)$$

where N is the instantaneous value of NHP, T is the instantaneous value of T25, $P_i$ is the instantaneous value of the pressure at the inlet of the engine and i is the incidence, these values being provided by sensors, the functions $F_1$, $F_2$ already integrating the other invariant parameters of the turbo-jet engine, including the VG setpoint positions for the current conditions.

The determination of the threshold values $(C/P)_{max}$ and $(C/P)_{min}$ as a function of the characteristics of the compressors and of thermodynamic characteristics of the engine is performed in a way known per se.

The determination of the threshold values $(C/P)_{max}$ (mainly protecting against compressor stalling) is made by a theoretical calculation upon dimensioning the compressor where the stalling characteristic P output/P input = $F(N/\sqrt{T})$ of the compressor is computed, a characteristic then validated by tests of the compressor. This characteristic is retranscribed in a field which may be utilized by the control unit, i.e. $C/P = F(N/\sqrt{T})$, these parameters N, C, P, T, being available to the control unit, and may then be confirmed and adjusted by engine tests.

The determination of the threshold values $(C/P)_{min}$ (mainly protecting from lean extinction of the engine) is made by a theoretical calculation upon dimensioning the combustion chamber where the extinction characteristic of the chamber: fuel flow C/air flow is computed, a characteristic then validated by chamber tests. This characteristic is retranscribed in a field which may be utilized by the control unit, i.e. C/P=F (N), these parameters N, C, P being available to the control unit, and may then be confirmed and adjusted by engine tests.

These threshold values are usually expressed in patterns of curves or in equations so as to be processed by the engine control unit.

The control system of FIG. 2 also comprises at least one local control loop 200 for a variable geometry 210, for example a control loop of the setting angle of stator vanes of a HP compressor with a variable setting angle allowing adaptation of the air flow deviations in the HP compressor to the conditions of the turbo-jet engine.

The position of the variable geometry is here slaved on the NHP speed of the HP shaft 18.

Figure 5:
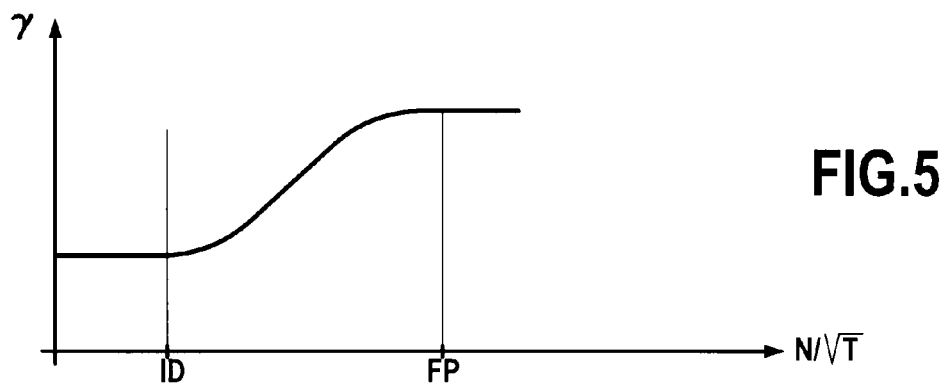
FIG. 5 represents the variation of the setting angle of stator vanes with variable setting angle in a compressor, as a function of $N/\sqrt{T}$ where N is the speed of rotation of the shaft driving the compressor and T is the temperature at the inlet of the compressor.

A function generator 202 receives a magnitude representative of NHP provided by a speed sensor and elaborates a setpoint value XVG* for the position of the variable geometry. In the case of compressor vanes with a variable setting angle, the setpoint value of the setting angle γ varies as indicated in FIG. 5 versus $N/\sqrt{T}$ wherein N is the speed of rotation of the shaft driving the compressor and T is the temperature at the inlet of the latter. Here, N=NHP and T=T25. The function generator 202 therefore also receives information representative of the temperature T25.

A position sensor 212 provides an XVG magnitude representative of the actual position of the variable geometry 210. The position sensor 212 is for example associated with a cylinder actuator controlling the position of the variable geometry 210.

A comparator 204 receives the quantities XVG* and XVG and provides to a corrector circuit 206 for example of the PID type, an E XVG value, representative of the difference between XVG* and XVG.

The corrector circuit 206 elaborates a magnitude representing the intensity of the control current for a servovalve 214 associated with the actuator of the variable geometry so as to bring the position of the latter to the setpoint value.

Figure 6:
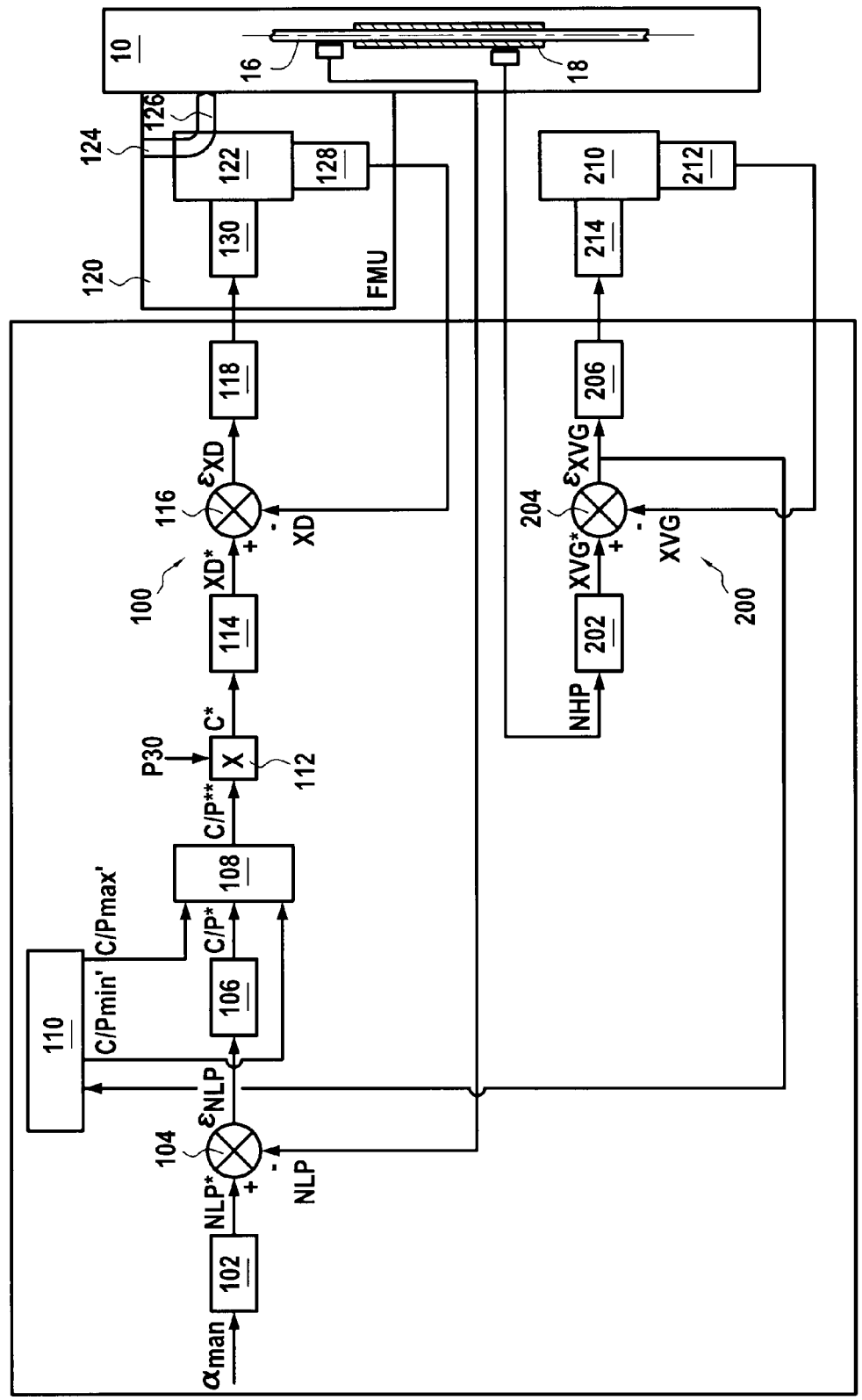
FIGS. 6 and 7 are diagrams of a turbo-jet engine control system according to a first and a second embodiment of the invention.
Figure 7:
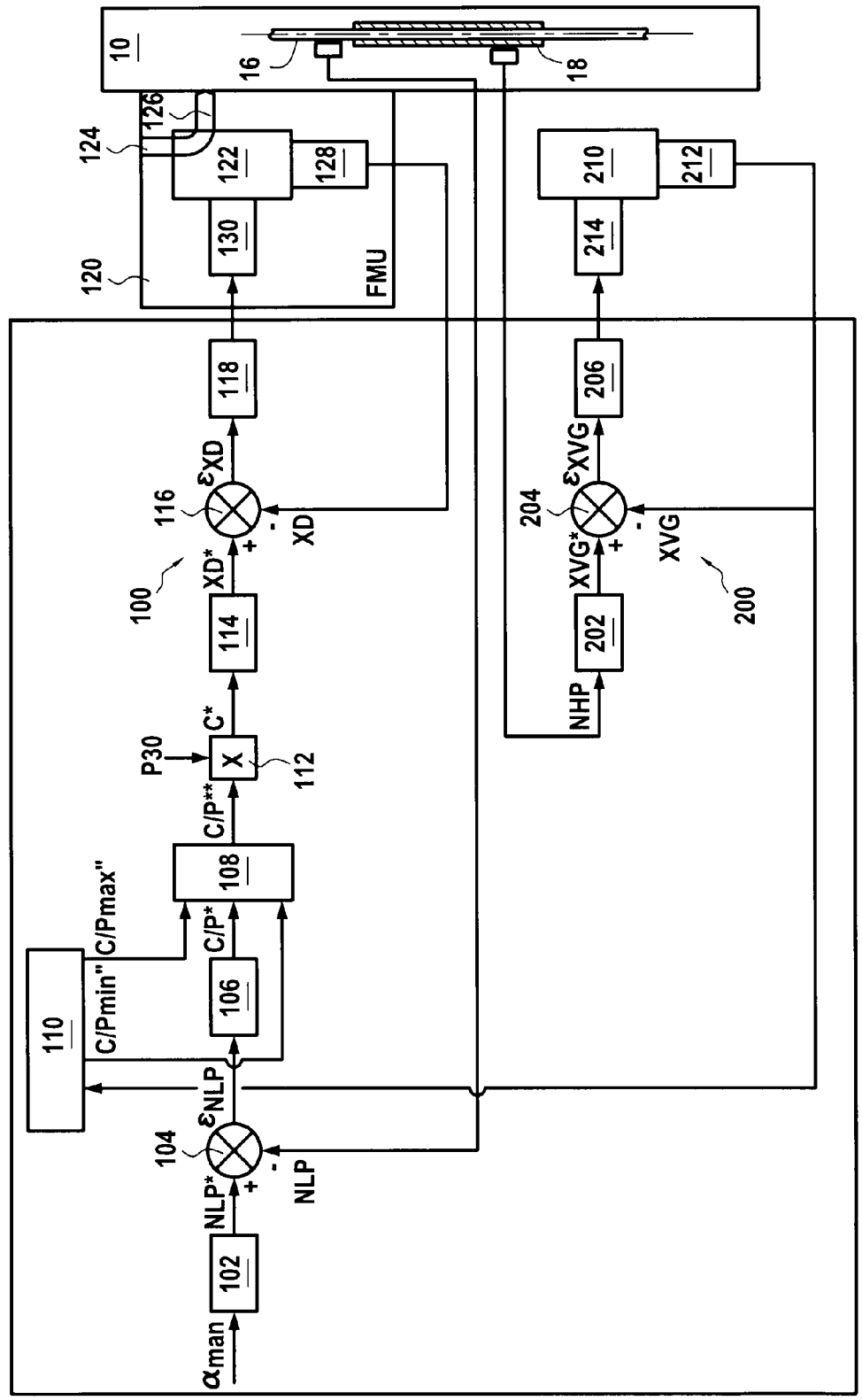

FIGS. 6 and 7 illustrate two embodiments of a control system according to the invention.

In FIGS. 6 and 7, the elements common with those of the control system of FIG. 2 bear the same references and will not again be described in detail.

The control system of FIG. 6 distinguishes from that of FIG. 2 in that the circuit 110 for computing the maximum and minimum C/P thresholds is connected to the outlet of the comparator 204 for receiving information representative of the difference εXVG between a setpoint position and an actual position of the variable geometry, such difference possibly being highly significant and disturbing under transient conditions.

The C/P maximum threshold value provided to the thresholding circuit 108 is then a modified value $(C/P)_{max'}$ automatically computed in real time such that:
$(C/P)_{max'} = (C/P)_{max} + k_1 * \varepsilon XVG$, where $(C/P)_{max}$ is computed as indicated with reference to FIG. 2 and $k_1$ is a correction factor which represents the coefficient of influence of the position of the relevant variable geometry on the stalling line.

Similarly, the C/P minimum threshold value provided to the thresholding circuit 108 is then a modified value $(C/P)_{min'}$ automatically computed in real time such that:
$(C/P)_{min'} = (C/P)_{min} + k_2 * \varepsilon XVG$, wherein $(C/P)_{min}$ is computed as indicated with reference to FIG. 2 and $k_2$ is a correction factor which represents the coefficient of influence of the position of the relevant variable geometry on the lean extinction line.

$k_1$ and $k_2$ may be positive or negative.

k1 is determined by seeking the stalling line (C/P)1 at a given geometry angle ang1 and then the stalling line (C/P)2 at another geometry angle ang2 in order to define the influence thereof:

$$k1 = [(C/P)2 - (C/P)1]/[ang2 - ang1]$$

k2 is determined by seeking the extinction line (C/P)1' at a given geometry angle ang1' and then the extinction line (C/P)2' at another geometry angle ang2' for defining the influence thereof:

$$k2 = [(C/P)2 - (C/P)1]/[ang2 - ang1]$$

The control system of FIG. 7 is distinguished from that of FIG. 2 in that the circuit 110 for computing the minimum and maximum C/P thresholds is connected to the position sensor 212 in order to receive the information representative of the actual position XGV of the variable geometry.

The computation circuit 110 automatically generates by computation in real time, maximum $(C/P)_{max''}$ and minimum $(C/P)_{min''}$ threshold values as:

$$(C/P)_{max''} = F'_1(N, T, P, \ldots, XVG)$$

$$(C/P)_{min''} = F'_2(N, T, P, \ldots, XVG)$$

wherein $F'_1$ and $F'_2$ are distinguished from the functions $F_1$ and $F_2$ in that they integrate the invariant parameters of the turbine engine with the positions of the VGs (variable geometries) at the relevant instant (and not their setpoint values).

For determining the threshold values $(C/P)_{max''}$ and $(C/P)_{min''}$ and their expression, it is proceeded in a similar way as for the determination and expression of the threshold values $(C/P)_{max}$ and $(C/P)_{min}$.

In the embodiments of FIGS. 6 and 7, the actual position of a variable geometry is taken into account. However, depending on the influence which they may have, it is possible to take into account the actual positions of several variable geometries by providing to the computation circuit 110 information representative of the differences between the setpoint position and the actual position or representative of the actual positions for the different variable geometries.

The invention is remarkable in that it allows the actual thermodynamic state of the turbine engine to be better taken into account in order to optimize the threshold values.

For a given compressor, as compared with the prior art, the risk of stalling or extinction related to an erroneous consideration of the thermodynamic state of the turbine engine is reduced and the acceleration times during speed changing may be improved.

Another provided possibility is to reduce the margin relatively to the stalling line, and therefore to optimize the design of the compressor.

Other provided possibilities are, for a given compressor, to accept lesser performances of the servocontrols of variable geometries, allowing reduced dimensioning and mass, or to allow an increase in the robustness to failures since in the case of a failure, the setpoint and position are different.

The invention claimed is:

1. A method for controlling a gas turbine including a compressor assembly including at least one portion of variable geometry, a combustion chamber, a turbine assembly, and a control system, the method comprising:
   computing, by the system, a C/P Fuel Air Ratio setpoint value as a function of a desired speed of the gas turbine where C is a rate of fuel flow to be fed to the combustion chamber and P is a pressure at an outlet of the compressor assembly;
   computing, by the system, a minimum and a maximum Fuel Air Ratio threshold value depending on a thermodynamic state of the gas turbine;
   thresholding, by the system, the Fuel Air Ratio setpoint value for maintaining the Fuel Air Ratio setpoint value greater than or equal to the minimum threshold value and less than or equal to the maximum threshold value;
   generating, by the system, a flow setpoint value for fuel to be fed to the combustion chamber based on the Fuel Air Ratio thresholded setpoint value;
   controlling a position of the variable geometry portion by controlling an actuator as a function of the difference between detected position information representative of an instantaneous position of the variable geometry portion and setpoint position information; and
   automatically adjusting, the threshold values, by the system, by real time computing as a function of the detected position information or of the difference between the detected position information and the setpoint position information.

2. The method according to claim 1, wherein the threshold values are computed as a function of a thermodynamic state of the gas turbine to which corresponds the setpoint position of the variable position portion and are corrected in real time as a function of the difference between the detected position and the setpoint position of the variable geometry portion.

3. The method according to claim 1, wherein the threshold values are computed as a function of a thermodynamic state of the gas turbine by directly taking into account the detected position of the variable geometry portion.

4. The method according to claim 1, wherein the variable geometry portion includes at least one of an assembly of stator vanes with variable setting angle and valves for picking up air in the compressor assembly.

5. The method according to claim 1, wherein the minimum threshold value is automatically adjusted based on a product of the difference between the detected position information and the setpoint position information and a correction factor representing a coefficient of influence of relevant variable geometry on a stalling line, and the maximum threshold value is automatically adjusted based on a product of the difference between the detected position information and the setpoint position information and a correction factor representing a coefficient of influence of the relevant variable geometry on a lean extinction line.

6. A system for controlling a gas turbine including a compressor assembly with at least one portion of variable geometry, a combustion chamber, and a turbine assembly, the control system comprising:
- a circuit to a C/P Fuel Air Ratio setpoint value as a function of a desired speed of the gas turbine, where C is a rate of fuel flow to be fed to the combustion chamber and P is a pressure at an outlet of the compressor assembly;
- a circuit to compute a minimum and a maximum Fuel Air Ratio threshold value depending on a thermodynamic state of the gas turbine;
- a circuit to threshold the Fuel Air Ratio setpoint value to maintain the Fuel Air Ratio setpoint value greater than or equal to the minimum limit threshold value or less than or equal to the maximum threshold value;
- a circuit to generate a flow setpoint value for fuel to be fed to the combustion chamber based on the Fuel Air Ratio thresholded set point;
- a circuit to control a position of the variable geometry portion comprising a position sensor to provide information representative of a detected position of the variable geometry portion, an actuator acting on the variable geometry portion to control its position, and a circuit to control the actuator to slave the position of the variable geometry portion on a setpoint position; and
- a circuit connected to the circuit for controlling the position of the variable geometry portion to automatically adjust the threshold values by real time computation as a function of the detected position information or of the difference between the detected position and the setpoint position.

7. The control system according to claim 6, wherein the circuit to compute threshold values is configured to compute threshold values as a function of a thermodynamic state of the gas turbine to which corresponds a setpoint position of the variable geometry portion and to correct the computed threshold values according to the difference between the detected position and the setpoint position of the variable geometry portion.

8. The control system according to claim 6, wherein the circuit to compute threshold values is configured to compute threshold values as a function of a thermodynamic state of the gas turbine by directly taking into account the detected position of the variable geometry portion.

9. The control system according to claim 6, wherein the circuit to compute threshold values is connected to at least one circuit to control the position of a variable geometry portion selected from an assembly of stator vanes with a variable setting angle and valves for picking up air in the compressor assembly.

10. An aircraft turbo-jet engine including a compressor assembly with at least one portion of variable geometry, a combustion chamber, and a turbine assembly, the control system comprising:
- a circuit to a C/P Fuel Air Ratio setpoint value as a function of a desired speed of the gas turbine, where C is a rate of fuel flow to be fed to the combustion chamber and P is a pressure at an outlet of the compressor assembly;
- a circuit to compute a minimum and a maximum Fuel Air Ratio threshold value depending on a thermodynamic state of the gas turbine;
- a circuit to threshold the Fuel Air Ratio setpoint value to maintain the Fuel Air Ratio setpoint value greater than or equal to the minimum limit threshold value or less than or equal to the maximum threshold value;
- a circuit to generate a flow setpoint value for fuel to be fed to the combustion chamber based on the Fuel Air Ratio thresholded set point;
- a circuit to control a position of the variable geometry portion comprising a position sensor to provide information representative of a detected position of the variable geometry portion, an actuator acting on the variable geometry portion to control its position, and a circuit to control the actuator to slave the position of the variable geometry portion on a setpoint position; and
- a circuit connected to the circuit for controlling the position of the variable geometry portion to automatically adjust the threshold values by real time computation as a function of the detected position information or of the difference between the detected position and the setpoint position.

11. The control system according to claim 6, wherein the minimum threshold value is automatically adjusted based on a product of the difference between the detected position information and the setpoint position information and a correction factor representing a coefficient of influence of relevant variable geometry on a stalling line, and the maximum threshold value is automatically adjusted based on a product of the difference between the detected position information and the setpoint position information and a correction factor representing a coefficient of influence of the relevant variable geometry on a lean extinction line.

* * * * *